US008383544B2

(12) United States Patent
Eckhoff et al.

(10) Patent No.: US 8,383,544 B2
(45) Date of Patent: Feb. 26, 2013

(54) DUAL-STAGE METHOD FOR THE REACTIVATION OF THERMALLY AGED NITROGEN OXIDE STORAGE CATALYSTS

(75) Inventors: Stephan Eckhoff, Alzenau (DE); Meike Wittrock, Biebergemuend (DE); Ulrich Goebel, Hattersheim (DE); Ina Grisstede, Mannheim (DE); Ruediger Hoyer, Alzenan-Hörstein (DE); Wilfried Mueller, Karben (DE); Thomas Kreuzer, Karben (DE); Maria Cristina Casapu, Waldshut-Tiengen (DE); Jan-Dierk Grunwaldt, Kgs. Lyngby (DK); Marek Maciejewski, Warsaw (PL); Aflons Baiker, Opfikon (CH)

(73) Assignee: Umicore AG & Co., KG, Hanau (DE)

( * ) Notice: Subject to any disclaimer, the term of this patent is extended or adjusted under 35 U.S.C. 154(b) by 0 days.

(21) Appl. No.: 12/599,411

(22) PCT Filed: Apr. 16, 2008

(86) PCT No.: PCT/EP2008/054583
§ 371 (c)(1), (2), (4) Date: Mar. 15, 2010

(87) PCT Pub. No.: WO2008/141875
PCT Pub. Date: Nov. 27, 2008

(65) Prior Publication Data
US 2010/0300077 A1 Dec. 2, 2010

(30) Foreign Application Priority Data

May 23, 2007 (DE) .......................... 10 2007 023 979

(51) Int. Cl.
*B01J 23/58* (2006.01)
(52) U.S. Cl. .......... 502/328; 502/304; 502/340; 502/53; 502/54; 502/55
(58) Field of Classification Search ............. 502/53–55, 502/304, 328, 340; 60/295
See application file for complete search history.

(56) References Cited

U.S. PATENT DOCUMENTS 7,638,452 B2 * 12/2009 Wittrock et al. ................ 502/55
2003/0144144 A1 * 7/2003 Goto et al. .................... 502/332
2006/0252638 A1 11/2006 Matsueda et al.

FOREIGN PATENT DOCUMENTS

WO  WO 2007/009679  1/2007

OTHER PUBLICATIONS

Liotta et al., A study of the behavior of Pt supported on $CeO_2$—$ZrO_2$/$Al_2O_3$—BaO as NOx storage-reduction catalyst for the treatment of lean burn engine emissions, 2002, Catalysis Today, 75, 439-449.*
Casapu, NOx storage-reduction catalysis; material aspects, thermal ageing and reactivation, 2007, pp. 1-155.*
The PCT International Preliminary Report on Patentability Chapter 1 and Written Opinion of the International Searching Authority issued by the European Patent Office on Dec. 11, 2009.

* cited by examiner

*Primary Examiner* — Colleen Dunn
*Assistant Examiner* — Pritesh Darji
(74) *Attorney, Agent, or Firm* — Smith, Gambrell & Russell, LLP

(57) ABSTRACT

Nitrogen oxide storage catalysts are used to remove the nitrogen oxides present in the lean exhaust gas of lean-burn engines. As a result of the stress due to high temperatures in vehicle operation, they are subject to thermal aging processes which affect both the nitrogen oxide storage components and the noble metals present as catalytically active components. The present invention provides a process with which the catalytic activity of a nitrogen oxide storage catalyst which comprises, in addition to platinum as a catalytically active component, basic compounds of strontium and/or barium on a support material comprising cerium oxide, said catalytic activity being lost owing to the thermal aging process, can be at least partly restored. The two-stage process is based on the fact that strontium and/or barium compounds formed during the thermal aging with the support material, which also comprise platinum, are recycled to the catalytically active forms by controlled treatment with specific gas mixtures.

17 Claims, 2 Drawing Sheets

DUAL-STAGE METHOD FOR THE REACTIVATION OF THERMALLY AGED NITROGEN OXIDE STORAGE CATALYSTS

INTRODUCTION AND BACKGROUND

The invention relates to a two-stage process for reactivating thermally aged nitrogen oxide storage catalysts which comprise nitrogen oxide-storing compounds on a support material comprising cerium oxide and platinum as a catalytically active noble metal.

Nitrogen oxide storage catalysts are used to remove the nitrogen oxides present in the lean offgas of lean-burn engines. The cleaning effect is based on, in a lean operating phase of the engine, storage of the nitrogen oxides by the storage material of the storage catalyst, predominantly in the form of nitrates, and, in a subsequent rich operating phase of the engine, decomposition of the nitrates formed beforehand and reaction of the nitrogen oxides released again with the reducing exhaust gas constituents over the storage catalyst to give nitrogen, carbon dioxide and water. The lean-burn engines include gasoline and diesel engines which can be operated with a lean air/fuel mixture. The nitrogen oxides present in the exhaust gas of these engines during the lean phases consist mainly of nitrogen monoxide.

The way in which nitrogen oxide storage catalysts work is described in detail in the SAE document SAE 950809. According to this, nitrogen oxide storage catalysts consist of a catalyst material which is usually applied in the form of a coating to a support body. The catalyst material comprises a nitrogen oxide storage material and a catalytically active component. The nitrogen oxide storage material in turn consists of the actual nitrogen oxide storage component, which is deposited on a support material in highly disperse form.

The storage components used are principally the basic oxides of the alkali metals, of the alkaline earth metals and of the rare earth metals, but especially strontium oxide and barium oxide, which react with nitrogen dioxide to give the corresponding nitrates. It is known that these materials are present under air predominantly in the form of carbonates and hydroxides. These compounds are likewise suitable for storing the nitrogen oxides. When reference is therefore made in the context of the invention to the basic stored oxides, this also includes the corresponding carbonates and hydroxides.

Suitable support materials for the storage components are thermally stable metal oxides with a high surface area of more than 10 $m^2/g$, which enable highly disperse deposition of the storage components. The present invention is concerned especially with storage materials which have cerium oxide-containing support materials. These include doped cerium oxides and particularly cerium-zirconium mixed oxides, which may likewise be doped.

The catalytically active components used are the noble metals of the platinum group, which may be present separately from the storage components on a separate support material. The support material used for the platinum group metals is usually active, high-surface area aluminum oxide, which may likewise comprise doping components.

The task of the catalytically active components is to convert carbon monoxide and hydrocarbons in the lean exhaust gas to carbon dioxide and water. They should also oxidize the nitrogen monoxide content of the exhaust gas to nitrogen dioxide, in order that it can react with the basic storage material to give nitrates. In the rich operating phase of the engine which follows, the nitrates formed are decomposed to nitrogen oxides and are reduced with the aid of the catalytically active components, using carbon monoxide, hydrogen and hydrocarbons as reducing agents, to nitrogen with formation of water and carbon dioxide.

In operation, storage catalysts are exposed to very high exhaust gas temperatures at times, which can lead to thermal damage to the catalysts. In the prior art, two main aging effects have been distinguished to date:

The catalytically active noble metal components in the freshly prepared storage catalyst are present in highly disperse form with mean particle sizes between about 2 and 15 nm. Particularly in the lean exhaust gas, an irreversible enlargement of the noble metal crystals is observed with rising exhaust gas temperature. This sintering is accompanied by a significant decrease in the catalytic activity.

The storage components are likewise subject to sintering at high temperatures, which reduces their catalytically active surface area. It has also been observed that the storage components deposited on support materials, at high temperatures, enter into compounds which have a lower storage capacity for nitrogen oxides with the support materials (see SAE Technical Paper 970746 and EP 0982066 A1). When, for example, barium oxide is used as a storage component on a support material comprising cerium oxide, barium cerate ($BaCeO_3$) can be formed.

The sintering of the noble metal particles or else of the storage components is an irreversible process. Restoration of the original crystal sizes and hence of the original catalytically active surface areas by a specific treatment does not appear to be possible to date. In contrast, components which are lost to the catalytic process because they react with other catalyst constituents to give less active compounds can in principle be recovered when the reaction products of such aging processes are nonvolatile. The prerequisite is that the reaction conditions under which the products formed in the aging reaction can be converted selectively back to the catalytically active starting compounds are known.

For example, barium cerate $BaCeO_3$, which during the thermal aging of nitrogen oxide storage catalysts which comprise barium oxide as a storage component in a cerium oxide-based nitrogen oxide storage material, can be decomposed back to barium oxide and cerium oxide by treatment with a gas mixture comprising nitrogen dioxide, water vapor and optionally carbon dioxide at 300° C. to 500° C. WO 07/009679 to this applicant describes a process for reactivating thermally aged nitrogen oxide storage catalysts, which is based on this operation.

The term "reactivation" in this context should be carefully distinguished from the term "regeneration" which is likewise commonly used in connection with nitrogen oxide storage catalysts.

During the lean operating phase of the engine, nitrogen oxides are stored in the storage material in the form of nitrates. With increasing incorporation, the storage capacity of the material decreases. Therefore, the storage material has to be regenerated from time to time. To this end, the engine is operated with rich air/fuel mixtures for a short time. The interplay of nitrogen oxide storage and regeneration of the storage material results in the cyclic method of operation composed of rich phases and lean phases which is characteristic of this catalyst type, the lean phase typically being 5 to 50 times as long as the rich phase.

The term "reactivation" of the catalyst refers exclusively to the partial restoration of the catalytic activity which has been lost beforehand in a thermal aging process. The thermal aging process is always superposed on the cyclic mode of operation, part of which is the regeneration, when the catalyst is exposed to high operating temperatures. The reactivation is not part of the standard vehicle operation, but instead must, if it can take place in the vehicle at all, be initiated and regulated in a controlled manner as a dedicated operating state by the engine control system of the vehicle. The catalyst can also be reactivated outside vehicle operation, for example during a service. To this end, it may be necessary to deinstall the aged catalyst to be reactivated from the vehicle and to treat it in a device separate from the vehicle.

Such a reactivation process is described in WO 07/009679 to this applicant. As already mentioned, in the process described herein, the catalytic activity of a thermally aged nitrogen oxide storage catalyst which comprises basic strontium or barium compounds on a support material comprising cerium oxide, and additionally comprises strontium and/or barium compounds formed by the thermal aging with the support material—in particular strontium cerate and/or barium cerate—is at least partly restored by treatment with a gas mixture comprising nitrogen dioxide, water vapor and optionally carbon dioxide at 300° C. to 50° C.

The process described in WO 07/009679 does not take account of the aging mechanisms to which the catalytically active noble metal components are subject, since it has been assumed to date that the main aging mechanism for noble metal is the irreversible sintering of the particles. Accordingly, the process described in WO 07/009679 to this applicant can achieve only a partial reactivation of a cerium oxide-based, thermally aged nitrogen oxide storage catalyst.

SUMMARY OF INVENTION

It was thus an object of the present invention to improve the reactivation process already described in WO 07/009679 to the effect that the catalytically active components damaged in thermal aging processes are also at least partly reactivated.

The achievement of the object requires a deeper understanding of the thermal aging processes with regard to the noble metals present in the nitrogen oxide storage catalysts.

There are indications in the recent prior art that the sintering of the noble metal particles might possibly not be the only relevant aging mechanism for the deactivation of the catalytically active components in cerium oxide-based nitrogen oxide storage catalysts with alkaline earth metal oxide as the nitrogen oxide storage component.

For instance, US 2006/0252638 A1 claims an exhaust gas catalyst with improved thermal aging stability, which comprises a rare earth element, an alkaline earth metal element and a noble metal, wherein a portion of the rare earth element and of the alkaline earth metal element form a composite oxide, and this composite oxide and a portion of the noble metal form a solid solution. The description states what the inventors consider to be the cause of the improved aging stability of this catalyst when the rare earth element used is cerium, the alkaline earth metal element barium and the noble metal platinum. According to this, the improved aging stability of the catalyst is based essentially on the reversibility of the formation of a solid solution of platinum, barium oxide and cerium oxide of the formula (Ba, Pt)CeO$_3$ or Ba(Ce, Pt)O$_3$. Under slightly lean exhaust gas conditions, Pt is accordingly part of the solid solution. At the transition to the slightly rich atmosphere, it is partly released from the composite again and deposited separately on the mixed oxide. In the case of a rapid switch between slightly rich and slightly lean conditions, as is customary in the operation of three-way catalysts, platinum thus remains available in active form according to the document cited.

To solve the problem stated here, it was thus first necessary to resolve the question of whether ternary oxides are also formed with inclusion of noble metal in cerium oxide-based nitrogen oxide storage catalysts with strontium or barium as the nitrogen oxide storage component, under what conditions, if any, this occurs, and what influence this has on the nitrogen oxide storage activity.

Investigations by the inventors have shown that, in a first step, platinum oxide PtO$_2$ is first formed at high temperatures in an oxygenous atmosphere. It has a certain thermal mobility in the catalyst and reacts with barium carbonate, the nitrogen oxide storage component, at 650 to 700° C. according to reaction equation (1) to give barium platinate:

$$PtO_2 + BaCO_3 \rightarrow BaPtO_3 + CO_2 \qquad (1)$$

When the nitrogen oxide storage component is present in supported form on a support material comprising cerium oxide, barium cerate forms at sufficiently high temperatures in a parallel reaction (2).

$$BaCO_3 + CeO_2 \rightarrow BaCeO_3 + CO_2 \qquad (2)$$

In a further reaction, which already occurs at temperatures from 770° C., barium cerate and barium platinate form a ternary mixed oxide:

$$BaPtO_3 + BaCeO_3 \rightarrow Ba_2CePtO_6 \qquad (3)$$

The compounds resulting from this process do not exhibit sufficient catalytic activity.

It was an object of the present invention, as already mentioned, to provide a process with which the original catalytic activity of such a damaged catalyst can be very substantially restored to a catalytically active state with recycling of the barium and of the platinum.

This object is achieved by a two-stage process for reactivating a thermally aged nitrogen oxide storage catalyst, wherein the storage catalyst comprises, in addition to platinum as a catalytically active component, basic strontium or barium compounds or strontium and barium compounds on a support material comprising cerium oxide, and additionally comprises strontium and/or barium compounds formed by thermal aging with the support material with inclusion of platinum. The process is characterized in that the catalyst, in a first process step, is heated in a reducing agent-containing gas mixture to a temperature between 100° C. and 500° C., and then, in a second process step offset in time, treated with a nitrogen dioxide- and water vapor-containing gas mixture at temperatures between 300° C. and 500° C.

As a result of this treatment, in the first process step, the barium cerium platinate is decomposed to release catalytically active platinum and to form barium oxide and barium cerate according to reaction equation (4):

$$Ba_2CePtO_6 + [Red] \rightarrow Pt + BaO + BaCeO_3 + [Red\text{-}O_2] \qquad (4)$$

[Red]=Reducing agent; [Red-O$_2$]=reaction product of reducing agent+2 O$^{2-}$

Ex.: [Red]=hydrogen=2 H$_2$ $\rightarrow$ [Red-O$_2$]=2 H$_2$O

In the second reaction stage, the barium cerate is decomposed entirely analogously to the process described in WO 07/009679.

In order to be able to release platinum in the first process step in finely divided, catalytically active form from the ternary oxide which comprises barium, cerium and platinum and is formed during the thermal aging, the aged catalyst has to be treated with a gas mixture which comprises a suitable reducing agent in a sufficient concentration. In order to convert barium to a nitrogen oxide-storing compound in the second process step, the catalyst has to be treated with a gas mixture which comprises at least nitrogen dioxide and water vapor in suitable concentrations. The type of gases required for reactivation determines the two-stage nature of the process: in the simultaneous presence of a reducing agent and of the nitrogen oxide which acts as an oxidizing agent in a gas mixture, the reaction of the reactants which are necessarily required for the reactivation with one another would be preferred. For the considerably slower reactivation of the catalyst, insufficient reducing agent or nitrogen dioxide would remain. It is evident from this that the first and second process steps must proceed in succession, i.e. offset in time.

The gas mixture used in the first process step preferably comprises hydrogen or carbon monoxide or ammonia or hydrocarbons or mixtures thereof as reducing agents. Particular preference is given to hydrogen or carbon monoxide or mixtures thereof. The concentrations of the reducing agent must be selected such that the gas mixture used in the first process step has reducing action on average, i.e. comprises proportionately more reducing agent than oxidizing components, for example oxygen. Any exhaust gas used in the first process step thus has to be rich, i.e. have an air ratio $\lambda<1$. Particularly suitable gas mixtures for use in the first process step are those which are free of oxygen.

The type of reducing agent used in the first process step also determines the optimal temperature which should be selected in the first partial reactivation of the thermally aged catalyst to re-release the platinum.

Preferably, in the first process step, a gas mixture which comprises hydrogen in a concentration of 0.5 to 15% by volume is used, the catalyst being heated to a temperature between 150° C. and 400° C. More preferably, the gas mixture comprises 3 to 15% by volume of hydrogen, most preferably 5 to 10% by volume of hydrogen. The recovery of the platinum in finely divided, catalytically active form commences in a hydrogenous atmosphere already at relatively low temperatures, and then proceeds with increasing rate at higher temperatures. The catalyst is heated in the hydrogenous atmosphere more preferably to 150° C. to 350° C., most preferably to 200° C. to 300° C.

When a gas mixture which comprises hydrocarbons as reducing agents is used in the first process step, temperatures of at least 300° C. are required. The catalyst is preferably heated in a gas mixture comprising 0.1 to 15% by volume of hydrocarbons in the first process step to a temperature between 300° C. and 500° C. The gas mixture more preferably comprises 1 to 10% by volume of hydrocarbons. When this gas mixture is free of oxygen, the splitting of the hydrocarbons used to form hydrogen proceeds from 300° C. In the case of residual oxygen contents, there is already partial oxidation of the hydrocarbons to form carbon monoxide at somewhat lower temperatures. In the simultaneous presence of water vapor, hydrogen is likewise formed as the consequence of a water gas shift reaction, in which carbon monoxide and water vapor are converted to carbon dioxide and hydrogen. The carbon monoxide and hydrogen components formed from these processes constitute the actual reducing agents which "recover" platinum from the barium cerium platinate formed during the aging.

In a further preferred embodiment, in the first process step, a gas mixture which comprises 0.5 to 15% by volume of carbon monoxide is used, the catalyst being heated to 150° C. to 400° C. Advantageous gas mixtures are in particular those with more than 5% by volume of carbon monoxide, more preferably those with 8 to 12% by volume of carbon monoxide. When the gas mixture also comprises 0.5 to 15% by volume of water vapor, preferably 5 to 10% by volume of water vapor, a rapid water gas shift reaction again occurs at temperatures from 200° C., the result of which is to form hydrogen, which is highly effective as a reducing agent with respect to barium cerium platinate. In the case of use of such a gas mixture, temperatures in the 200° C. to 400° C. range in the first process stage lead to an outstanding reactivation result.

In the case that the nitrogen oxide storage catalyst to be reactivated is part of an emission control system on a vehicle with a lean-burn engine, the use of a gas mixture comprising ammonia as a reducing agent in the first process step may be particularly advantageous. This is especially true when the emission control system, apart from the nitrogen oxide storage catalyst, comprises a catalyst for selective catalytic reduction and a device for metering ammonia or a compound which is decomposable to ammonia in the exhaust gas line. Ammonia can then be introduced additionally into the exhaust gas line in the first process step via a metering point arranged upstream of the nitrogen oxide storage catalyst and be used to reduce the platinum in $Ba_2CePtO_6$.

After treatment of the thermally aged nitrogen oxide storage catalyst with a gas mixture comprising reducing agent in the first process stage, platinum in catalytically active form is present alongside BaO contents (or contents of nitrogen oxide-storing BaO conversion products such as $BaCO_3$ or $Ba(OH)_2$) and larger amounts of barium cerate. Since barium cerate is incapable of effectively storing nitrogen oxides, the first process stage must be followed by a second, during which the barium cerate is decomposed to barium oxide and cerium oxide. This second process stage follows essentially the process described in WO 2007/009679 to this applicant, the description of which is referred to here.

In the second process step, the catalyst is treated with a gas mixture comprising nitrogen dioxide and water vapor at temperatures between 300° C. and 500° C. The gas mixture preferably comprises 0.05 to 35% by volume of nitrogen oxides in addition to 5 to 50% by volume of oxygen and 5 to 30% by volume of water vapor. Particularly rapid and complete decomposition of the barium cerate is achieved when the gas mixture used in the second process stage also comprises 5 to 20% by volume of carbon dioxide.

The process according to the invention is suitable for reactivating thermally aged nitrogen oxide storage catalysts which are part of an emission control system on a vehicle with a lean-burn engine.

According to the configuration of the invention, it may be advantageous to deinstall the catalyst from the vehicle to perform the reactivation. In this case, the entire two-stage reactivation process can proceed outside the vehicle in an apparatus suitable therefor. It is likewise conceivable that only the first process stage is performed outside the vehicle, whereas the second process stage proceeds "onboard" using the exhaust gas generated by the lean-burn engine at particular operating points.

When the catalyst is deinstalled from the vehicle to perform the reactivation, for example during a routine service, the reactivation can be effected, for example, in a temperature-controlled oven through which a suitable gas mixture flows. The gas mixtures required can be provided premixed in gas pressure vessels. The gas mixtures required can likewise be prepared with optimal composition from their constituents, which are initially charged in different gas pressure vessels, optionally supplemented by a water vessel with an evaporator, in a temperature-controlled gas mixing zone connected upstream of the oven. The advantage of such an embodiment is that both the composition of the gas mixtures used for reactivation and the reactivation times can be adjusted optimally. Thus, it is particularly advantageous when the gas mixture used in the first process step is oxygen-free. When the nitrogen oxide storage catalyst is part of an emission control system on a vehicle with a lean-burn engine, such an oxygen-free gas mixture cannot be provided by engine exhaust gas, since the exhaust gas which can be generated by the engine has significant residual oxygen contents at all customary operating points. The performance of a (partial) reactivation outside the vehicle is thus an option.

The treatment of the thermally aged nitrogen oxide storage catalyst in the case of performance of the reactivation outside the vehicle preferably lasts 0.2 to 12 hours in the first process step, and 0.1 to 5 hours in the second process step.

When the thermally aged nitrogen oxide storage catalyst to be reactivated is part of an emission control system on a vehicle with a lean-burn engine and exhaust gas recycling, the reactivation process can also be performed "onboard" on the vehicle, in which case the gas mixtures required for reactivation are formed by the exhaust gas of the internal combustion engine. The gas mixture used in the first process stage is then exhaust gas from the lean-burn engine with an air ratio $\lambda<1$, the gas mixture used in the second process stage exhaust gas from the lean-burn engine with a nitrogen dioxide content of 0.02 to 2% by volume.

To obtain such a high nitrogen dioxide content in the exhaust gas of the lean-burn engine, defined operating points have to be selected, and the typically supplementary measures for increasing the nitrogen oxide concentration in the exhaust gas which are known to those skilled in the art have to be undertaken, for example switching off the exhaust gas recycling and altering the ignition time. It is also advantageous when the exhaust gas system, on the inflow side to the nitrogen oxide storage catalyst, comprises at least one further catalyst with significant oxidizing power, for example a three-way catalyst or a diesel oxidation catalyst or a further nitrogen oxide storage catalyst. This serves to prepare $NO_2$ from the NO and oxygen present in excess in the untreated emission in the lean exhaust gas. Moreover, such a catalyst serves to oxidize carbon monoxide from the untreated emission to carbon dioxide. As described in WO 2007/009679, the decomposition of the barium cerate, which is to be effected in the second process step, can also be effected by treating with a gas mixture comprising carbon dioxide at temperatures above 400° C. Therefore, the use of an exhaust gas with a carbon dioxide content of 5 to 20% by volume in the second process step is very particularly preferred.

Particular preference is given to embodiments of the process according to the invention in which the nitrogen oxide storage catalyst is deinstalled from the vehicle only to perform the first process step, and is treated in a system suitable therefor with a gas mixture comprising hydrogen at 150° C. to 400° C., preferably 200° C. to 350° C., over a period of 0.5 to 5 hours, while the second process step is effected after reinstallation of the partly regenerated catalyst in vehicle operation of a vehicle with lean-burn engine and exhaust gas recycling.

BRIEF DESCRIPTION OF DRAWINGS

The invention is illustrated in detail using a few examples and figures. The figures show.

DETAILED EMBODIMENTS OF INVENTION

COMPARATIVE EXAMPLE 1

In this comparative example, the aging effects were first studied in a platinum-rich nitrogen oxide storage catalyst.

To prepare the catalyst, 100 g of commercially available cerium oxide with a BET surface area of approx. 100 $m^2/g$ were impregnated by the incipient wetness method with barium acetate solution until the amount of solution absorbed corresponded to a content of 20 g of BaO after calcination. Between each impregnation step, the powder was dried at 80° C. The last impregnation was followed by calcination at 500° C. for 5 hours. Platinum was applied to the $BaO/CeO_2$ powder thus obtained by impregnation with $[Pt(NH_3)_2(NO_2)_2]$ solution, drying at 80° C. and calcination again at 500° C. for a period of 5 hours. p The finished catalyst powder comprised 7.7% by weight of platinum and 15.4% by weight of BaO.

Figure 1:
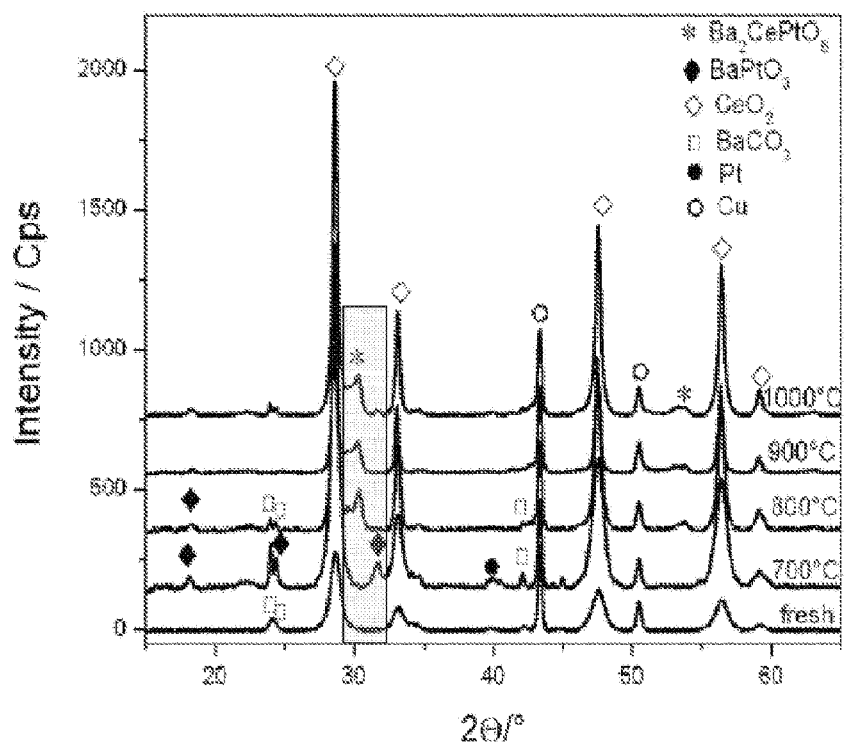
FIG. 1: Powder X-ray diffractograms of a powder catalyst comprising 7.7% by weight of platinum and 15.4% by weight of BaO on $CeO_2$ (VK1 from comparative example 1) in the freshly prepared state and after thermal aging under air at 700° C., 800° C., 900° C. and 1000° C. over a duration of 12 hours.

To study the aging mechanism in an oxygenous atmosphere, samples of the powder catalyst VK-1 thus obtained were heat treated under air for 12 hours each, with selected temperatures of 700° C., 800° C., 900° C. and 1000° C. The thermally aged powders were analyzed compared to the freshly prepared catalyst powder with the aid of powder X-ray diffractometry. The corresponding diffractograms are shown in FIG. 1.

In the fresh state, apart from the standard Cu reflections, only the reflections typical of $CeO_2$ and barium carbonate are evident. The platinum is present in the X-ray-amorphous state, i.e. in fine distribution.

After heat treatment at 700° C., in addition to sintering of the platinum up to the crystalline state ($\rightarrow$Pt reflection at $2\Theta=40°$), the formation of barium platinate is evident. Calcination at higher temperatures leads to progression of the aging reaction to form $Ba_2CePtO_6$, in the course of which the barium platinate formed in the first intermediate stage disappears again. The disappearance of the Pt reflection at $2\Theta=40°$ shows that platinum reacts completely with the oxidic materials.

COMPARATIVE EXAMPLE 2

For proof that the aging processes observed in the platinum-rich powder catalyst VK-1 also take place at lower platinum concentrations, the process described in comparative example 1 was used to produce a catalyst which differed from the catalyst powder prepared in comparative example 1 only in the platinum concentration: 20 g of BaO and 1 g of Pt were applied to 100 g of $CeO_2$, such that the finished catalyst powder contained 0.8% by weight of Pt and 16.5% by weight of BaO.

Figure 2:
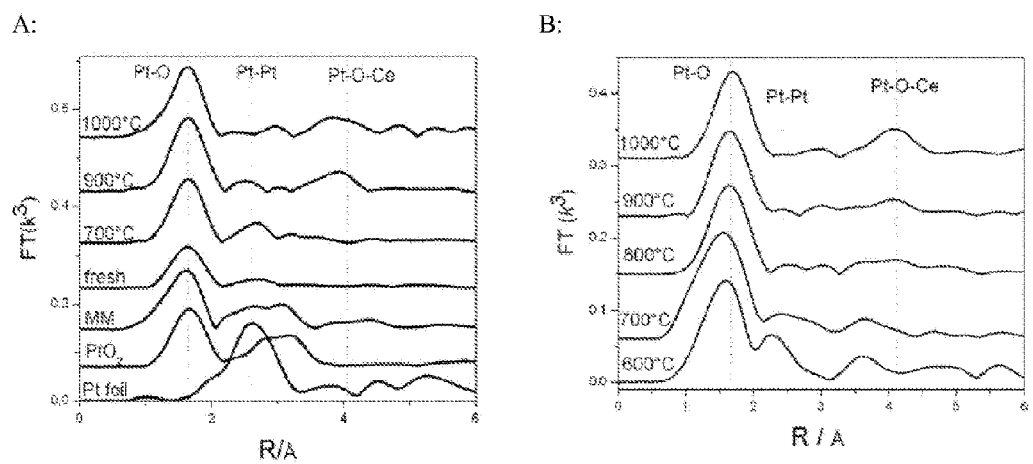
FIG. 2: Fourier-transformed EXAFS spectra at the Pt L3 edge of freshly prepared and thermally aged catalyst powders; part A (left) shows the EXAFS spectra of the powder catalyst comprising 7.7% by weight of platinum and 15.4% by weight of BaO on $CeO_2$ (VK-1), and also comparative spectra of $PtO_2$ and platinum foil; part B (right) shows the EXAFS spectra of the low-platinum comparative catalyst VK-2, comprising 0.8% by weight of Pt and 16.5% by weight of BaO on $CeO_2$.

Samples of the catalyst powder VK-2 thus obtained were heat treated under air for 12 hours each, with selected temperatures of 600° C., 700° C., 800° C., 900° C. and 1000° C. The thermally aged powders were analyzed in comparison to corresponding samples of VK-1 in an EXAFS experiment (EXAFS—extended x-ray absorption fine structure; X-ray absorption spectroscopy). FIG. 2 shows the results of the measurements as Fourier-transformed EXAFS spectra. Part A (left) shows the EXAFS spectra of the VK-1 samples, and comparative spectra of the fresh material, of $PtO_2$ and of platinum foil. Part B (right) shows the EXAFS spectra of the low-platinum comparative catalyst VK-2.

The signals at 3.6 Ångström and 4.2 Ångström observed from 800° C. in both samples are characteristic of the adjacent barium and cerium atoms in the perovskite lattice of $Ba_2CePtO_6$.

EXAMPLE 1

A sample of the platinum-rich powder catalyst VK-1 prepared in comparative example 1 was heat treated at 1000° C. for 12 hours. Samples of the thermally aged catalyst powder thus prepared, which, according to the analyses from comparative example 1, contained $Ba_2CePtO_6$, were subjected to different reductive treatments:

a.) treatment with a gas mixture comprising 10% by volume of hydrogen in helium at 400° C.;
b.) treatment with a gas mixture comprising 10% by volume of carbon monoxide in helium at 400° C.;
c.) treatment with a gas mixture comprising 10% by volume of propene $C_3H_6$ at 500° C.

Figure 3:
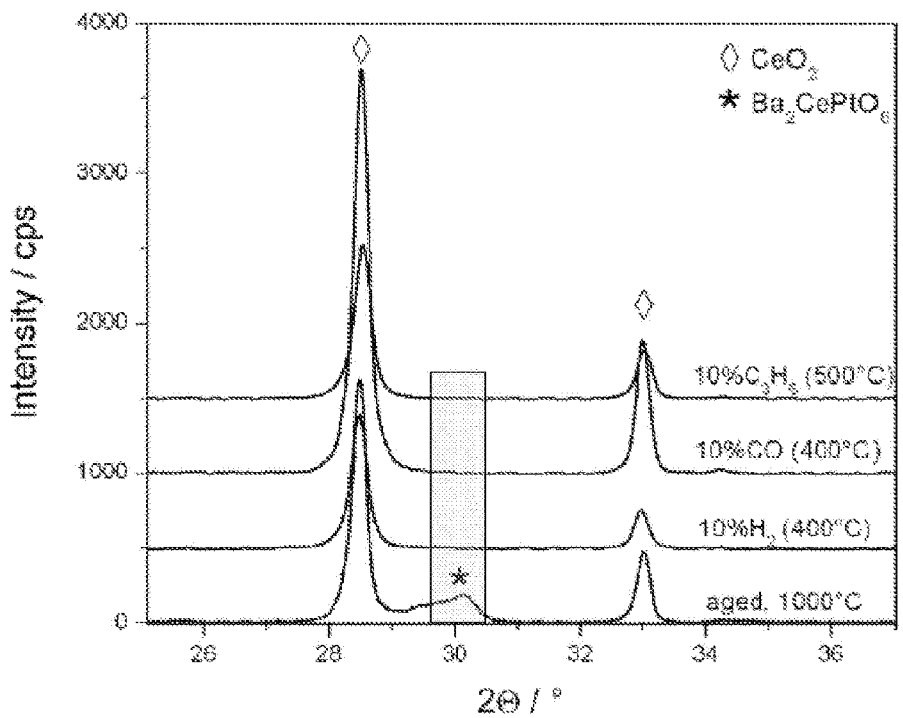
FIG. 3: Powder diffractograms of the powder catalyst VK-1 which has been heat treated under air at 1000° C. for 12 hours, comprising 7.7% by weight of platinum and 15.4% by weight of BaO on $CeO_2$, in the aged state and after treatment with a) 10% by volume of hydrogen in helium at 400° C., b) 10% by volume of carbon monoxide in helium at 400° C. and c) 10% by volume of propene in helium at 500° C.

After the treatment, the samples were analyzed with the aid of powder X-ray diffractometry. FIG. 3 shows sections from the powder diffractograms for the range of 2Θ=25-37°, in which the reflection characteristic of $Ba_2CePtO_6$ at 2Θ=30.2° lies. It is clearly evident that the reflection characteristic of $Ba_2CePtO_6$ has disappeared completely after the reductive treatments. The complete diffractograms which are not shown additionally show an increase in the reflection intensities characteristic of barium cerate, and the reoccurrence of barium carbonate reflections.

EXAMPLE 2

To study the influence of the products of the aging reactions, pulsed thermoanalysis studies were performed [For experimental setup and method, cf. M. Maciejewski, C. A. Muller, R. Tschan, W. D. Emmerich, A. Baiker, *Thermochim. Acta* 295 (1997) 167].

A sample of the low-platinum catalyst powder which has been heat treated at 700° C. for 12 hours from comparative example 2, VK-2, was studied in comparison to the freshly prepared powder and to a corresponding sample reactivated with hydrogen pulses at 400° C.

Figure 4:
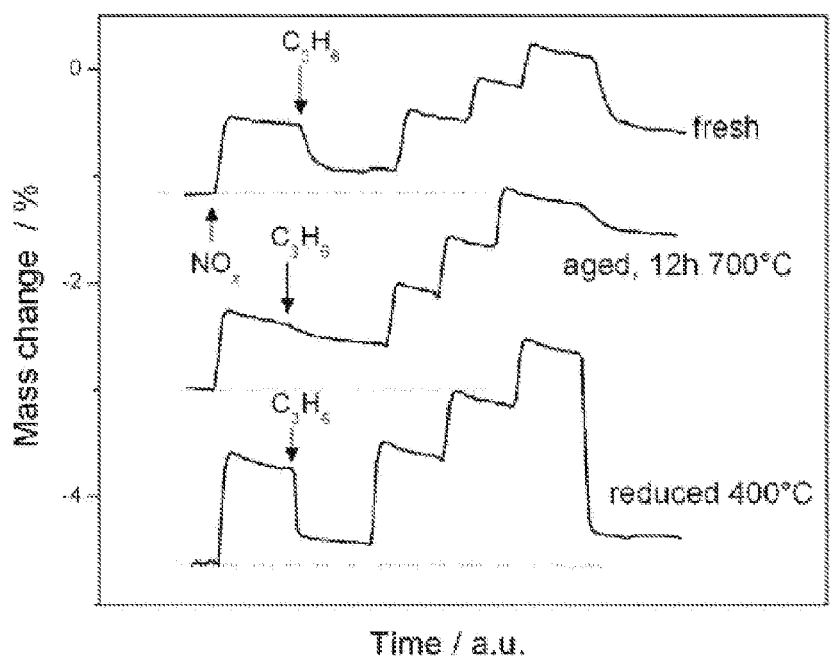
FIG. 4: Results of a pulse thermogravimetry experiment on a sample of the low-platinum catalyst powder from comparative example 2, VK-2, which has been heat treated at 700° C. for 12 hours, compared to the freshly prepared powder and to a corresponding sample reactivated with hydrogen pulses at 400° C.

The samples were heated at 500° C. under helium at the start of each and every experiment. For simulation of the lean phase, alternating pulses of NO and oxygen were then injected into the carrier gas. Subsequently, the regeneration phase was simulated by propene pulses. The thermogravimetry curves recorded during the experiments are shown in FIG. 4.

The changes in mass observed during the storage phase are the result of two superposed effects: barium nitrate formation and barium carbonate decomposition. The results show that all three samples have comparable nitrogen oxide storage capacities under the selected reaction conditions. The storage behavior is determined crucially by the nitrogen oxide concentrations which are selected at a very high level of 10,000 ppm.

The main restriction in the reactivity of the aged material results from the loss of the regeneration activity. During $NO_x$ regeneration, platinum is necessarily required in order to keep the "clearance" of the nitrogen oxide stored by the subsequent reaction of the $NO_x$ with the propene reducing agent in progress. Since the noble metal is no longer present in the catalytically active state owing to the thermal aging processes, this process in the aged catalyst is inhibited; virtually no nitrogen oxide regeneration takes place.

The catalyst reactivated with hydrogen exhibits a nitrogen oxide storage and regeneration activity which corresponds virtually completely to the freshly prepared catalyst.

The invention claimed is:

1. A process for reactivating a thermally aged nitrogen oxide storage catalyst which comprises, in addition to platinum as a catalytically active component, basic strontium or barium compounds or strontium and barium compounds on a support material comprising cerium oxide, and additionally comprises ternary mixed oxides formed from strontium and/or barium compounds, cerium oxide, and platinum, and which is used for emission control in a motor vehicle with a lean-burn engine, which comprises a first process step of releasing catalytically active platinum from the ternary mixed oxides by heating the catalyst in a reducing agent-containing gas mixture to a temperature between 100° C and 500° C, and then a second process step, which is offset in time with the first process step, of converting the strontium and/or barium cerates resulting from the first process step into strontium oxide and/or barium oxide by treating the catalyst with a nitrogen dioxide- and water vapor-containing gas mixture at temperatures between 300° C and 500° C.

2. The process as claimed in claim 1, wherein the gas mixture used in the first process step comprises, as the reducing agent, hydrogen or carbon monoxide or ammonia or hydrocarbons or mixtures thereof.

3. The process as claimed in claim 2, wherein the gas mixture used in the first process step comprises 0.5 to 15% by volume of hydrogen, and the catalyst is heated to a temperature between 150° C and 400° C.

4. The process as claimed in claim 2, wherein the gas mixture used in the first process step comprises 0.1 to 15% by volume of hydrocarbons, and the catalyst is heated to a temperature between 300° C and 500° C.

5. The process as claimed in claim 2, wherein the gas mixture used in the first process step comprises 0.5 to 15% by volume of carbon monoxide, and the catalyst is heated to a temperature between 150° C and 400° C.

6. The process as claimed in claim 5, wherein the gas mixture used in the first process step also comprises 0.5 to 15% by volume of water vapor.

7. The process as claimed in claim 1, wherein the gas mixture used in the second process step comprises 0.05 to 35% by volume of nitrogen oxides, 5 to 50% by volume of oxygen and 5 to 30% by volume of water vapor.

8. The process as claimed in claim 7, wherein the gas mixture used in the second process step also comprises 5 to 20% by volume of carbon dioxide.

9. The process as claimed in claim 1, wherein the nitrogen oxide storage catalyst is part of an emission control system on a vehicle with a lean-burn engine, and the catalyst is deinstalled from the vehicle to perform the reactivation.

10. The process as claimed in claim 9, wherein the gas mixture used in the first process step is oxygen-free.

11. The process as claimed in claim 10, wherein the treatment of the catalyst in the first process step lasts 0.2 to 12 hours, the treatment of the catalyst in the second process step 0.1 to 5 hours.

12. The process as claimed in claim 1, wherein the nitrogen oxide storage catalyst is part of an emission control system on a vehicle with a lean-burn engine and exhaust gas recycling, and the gas mixtures required for reactivation are formed by the exhaust gas of the internal combustion engine.

13. The process as claimed in claim 1, wherein the gas mixture used in the first process step is exhaust gas from the lean-burn engine with an air ratio $\lambda < 1$.

14. The process as claimed in claim 13, wherein the gas mixture used in the second process step is exhaust gas from the lean-burn engine with a nitrogen dioxide content of 0.02 to 2% by volume.

15. The process as claimed in claim 14, wherein the gas mixture used in the second process step is exhaust gas from the lean-burn engine with a carbon dioxide content of 5 to 20% by volume.

16. The process as claimed in claim 2, wherein the nitrogen oxide storage catalyst is part of an emission control system on a vehicle with a lean-burn engine, and the gas mixtures required for reactivation are formed by the exhaust gas of the internal combustion engine and additionally components introduced into the exhaust gas line.

17. The process as claimed in claim 16, wherein ammonia is additionally introduced into the exhaust gas line in the first process step.

* * * * *